United States Patent [19]

Chen et al.

[11] Patent Number: 5,751,905
[45] Date of Patent: May 12, 1998

[54] STATISTICAL ACOUSTIC PROCESSING METHOD AND APPARATUS FOR SPEECH RECOGNITION USING A TONED PHONEME SYSTEM

[75] Inventors: Chengjun Julian Chen, Yorktown Heights; Ramesh Ambat Gopinath, White Plains; Michael Daniel Monkowski, New Windsor; Michael Alan Picheny, White Plains, all of N.Y.

[73] Assignee: International Business Machines Corporation, Armonk, N.Y.

[21] Appl. No.: 404,786

[22] Filed: Mar. 15, 1995

[51] Int. Cl.$^6$ .................................................. G10L 5/06
[52] U.S. Cl. .................... 395/2.63; 395/2.6; 395/2.64; 395/2.65; 395/2.66
[58] Field of Search ......................... 395/2, 2.6, 2.63, 395/2.64, 2.65, 2.66, 2.16; 381/39, 41, 43, 44, 45, 49, 50

[56] References Cited

U.S. PATENT DOCUMENTS

| | | | |
|---|---|---|---|
| 4,817,159. | 3/1989 | Hoshimi et al. | 381/43 |
| 4,980,917 | 12/1990 | Hutchins | 381/41 |
| 5,208,897 | 5/1993 | Hutchins | 395/2 |
| 5,220,639 | 6/1993 | Lee | 381/41 |

OTHER PUBLICATIONS

H.W. Hon et al "Towards Large Vocabulary Mandarin Chinese Speech Recognition" The Proceedings of ICASSP, pp. 545–548, 1994.

L. Lee et al "Golden Mandarin (I)—A Real–Time Mandarin Speech Dictation . . . " IEEE Trans on Speech & Audio Proc. Vo. 1, #2 Apr. 1993 pp. 158–179.

L.R. Bahl et al "Robust Methods For Using Context–Dependent Features & Models In a Continuous Speech Recognizer" ICASSP–94 I–533.

Y. Goa et al "Tangerine: A Large Vocabulary Mandarin Dictation System".

*Primary Examiner*—Krista M. Zele
*Assistant Examiner*—Scott L. Weaver

[57] ABSTRACT

A method and apparatus for acoustic signal processing of speech recognition, the method comprising the following components: 1) Decompose each syllable into two phonemes of comparable length and complexity, the first one being a preme, and the second one being a toneme; 2) Each toneme is assigned a tone value such as high, rising, low, falling, and untoned; 3) No tone value is assigned to premes; 4) Pitch is detected continuously and treated the same way as energy and cepstrals in a Hidden Markov Model to predict the tone of a toneme; 5) The tone of a syllable is defined as the tone of its component toneme.

12 Claims, 7 Drawing Sheets

STATISTICAL ACOUSTIC PROCESSING METHOD AND APPARATUS FOR SPEECH RECOGNITION USING A TONED PHONEME SYSTEM

FIELD OF THE INVENTION

The invention relates to speech processing, and in particular to the recognition of speech having tonal components.

BACKGROUND OF THE INVENTION

The input of Chinese language text into the computer is a very difficult problem. In spite of intensive studies for several decades and the existence of hundreds of different methods, text input is still a major obstacle for using computers in China.

Because of the vast number of Chinese language characters, keyboards have proven to be an unsatisfactory text entry interface. As an alternative to keyboards, Chinese language speech recognition has been pursued for more then 20 years. Recently, dictation systems for English and other European languages have become a reality. But because a keyboard is convenient and effective for English and other European languages, the need for speech recognition in these languages is, relatively speaking, not pressing. For Chinese language users, however, the alternative of speech recognition as an input method, if it can be realized with reasonable accuracy, speed, and price, would revolutionize computer use. In fact, for more than two decades, both sides of China (PRC and ROC) have invested substantially in the research work of speech recognition. In spite of these intensive studies, however, there is no product with reasonably good recognition accuracy to function as a general purpose dictation machine.

It is reasonable to think about adapting English language speech recognition systems to the Chinese language. However, the Chinese language has its own unique features having no analog in European languages. Although the syllable structure is simple in Chinese, each syllable has a tone (pitch contour) associated with it. Syllables with the same consonant(s) and vowel(s), but with different tones represent different morphemes, having completely different meanings. Thus, Chinese language speech recognition systems lacking pitch detection capability can be used only for limited-vocabulary input or for control or information retrieval systems. Consequently, all reasonably universal Chinese language speech recognition systems (as developed in China and Taiwan) contain a tone recognition component based on pitch detection. Such components generally comprise a dedicated expert system or a separate statistical model for tones only.

It can be seen, therefore, that the prior art Chinese language recognition system are substantially different from those for European languages. The powerful and accurate methods already accumulated for English and other European languages have not yet been fully utilized.

The Phonetics of Mandarin Chinese will now be briefly described. These well-known phonetics are often taken literally as the basis for speech recognition. The language has a relatively small number of syllables: altogether it has 408 different syllables, when excluding tone. The pitch contours of a syllable, however, subdivide the 408 syllables into 1400 toned syllables. Each syllable contains an initial consonant (21 different ones) and a final (38 different ones), although a syllable might instead consist of only a final (i.e., a vowel or a vowel with a nasal ending), without an initial consonant. Each syllable has a pitch contour which defines one of five different tones. The five tones in Mandarin Chinese are: high (yinping), rising (yangping), low (shang), falling (qu), and untoned or degenerate (qing).

The initial consonants are single consonants: voiced; unvoiced; or aspirated. The unvoiced and aspirated consonants do not have any pitch. The finals are rather complicated. There are eight different types:

1) Eight single vowels: a, e, i, o, u, ü, I, ë;
2) Nine diphthongs: ai, ei, ao, ou, ia, ie, ua, uo, üe;
3) Four triple vowels: iao, iou, uai, uei;
4) Four vowels with front nasal endings: an, en, in, ün;
5) Four vowels with back nasal endings: ang, eng, ong, ing;
6) Four diphthongs with front nasal endings: ian, uan, uen, üan;
7) Four diphthongs with back nasal endings: iang, iong, uang, ueng; and
8) One vowel with r ending: er.

Various methods for using tone information in the recognition of Chinese language speech have been proposed. In one such existing Chinese speech recognition system, as described in U.S. Pat. No. 5,220,639, acoustic processing is conducted in two channels in parallel. A first channel recognizes the syllables (the initials and finals) without tone, using conventional log-FFT or log-FFT cepstral methods. This method, as well as others, treats the initials as individual phoneme units. One of two approaches is used for recognizing the finals:

1) Treat each final as one phoneme. In this case, each syllable (without tone) is represented as two phonemes (or a single phoneme if there is no initial). The drawback of this approach is that the complexity of finals varies tremendously: from a single vowel to a triple vowel or a diphthong with a nasal ending. Therefore, lots of confusion has been reported. Also, the zero initial case and several weak initials such as b, d, and g, are easily confused.

2) Treating each single vowel and nasal consonant in a final as individual phonemes. In this case, a final can be represented by one, two, or three phonemes. A syllable, therefore, can be then represented by one, two, three, or four phonemes. In the case of isolated syllable recognition, this approach does not cause a serious problem. In continuous speech recognition, however, there is a high probability that a complicated syllable would be misrecognized as two simpler syllables, or vice versa.

In such parallel systems, tone is recognized via an independent channel. The pitch contour defining the tone is extracted from recordings of the input speech. Then, an expert system (setting a criterion to differentiate the tones), or a separate hidden Markov model specifically designed for tone recognition, is applied. The tone value detected using either method is then combined with the bare syllable to predict a toned syllable.

In the best reported results of isolated syllable recognition, the recognition error rate is 5%. The error rate for tone recognition is also 5%. Because the two channels are independent, the combined error rate may approach 10%.

While somewhat satisfactory in the discrete speech recognition context, the separate detection of syllable and tone is difficult to apply to continuous Chinese speech recognition. Because many initials are unvoiced or aspirated and have no pitch, known algorithms are complicated and not robust.

SUMMARY OF THE INVENTION

The present invention makes it possible to transplant the powerful basic methods of speech recognition for European languages to the recognition of Chinese language speech. This is achieved by introducing a novel phoneme system, in which tones are included from the very beginning at the phoneme level, and pitch data is processed the same way as conventional speech variables, that is, with respect to cepstra and energy. High recognition accuracy has been demonstrated with this novel scheme.

FIGURES

DETAILED DESCRIPTION OF THE INVENTION

Figure 1:
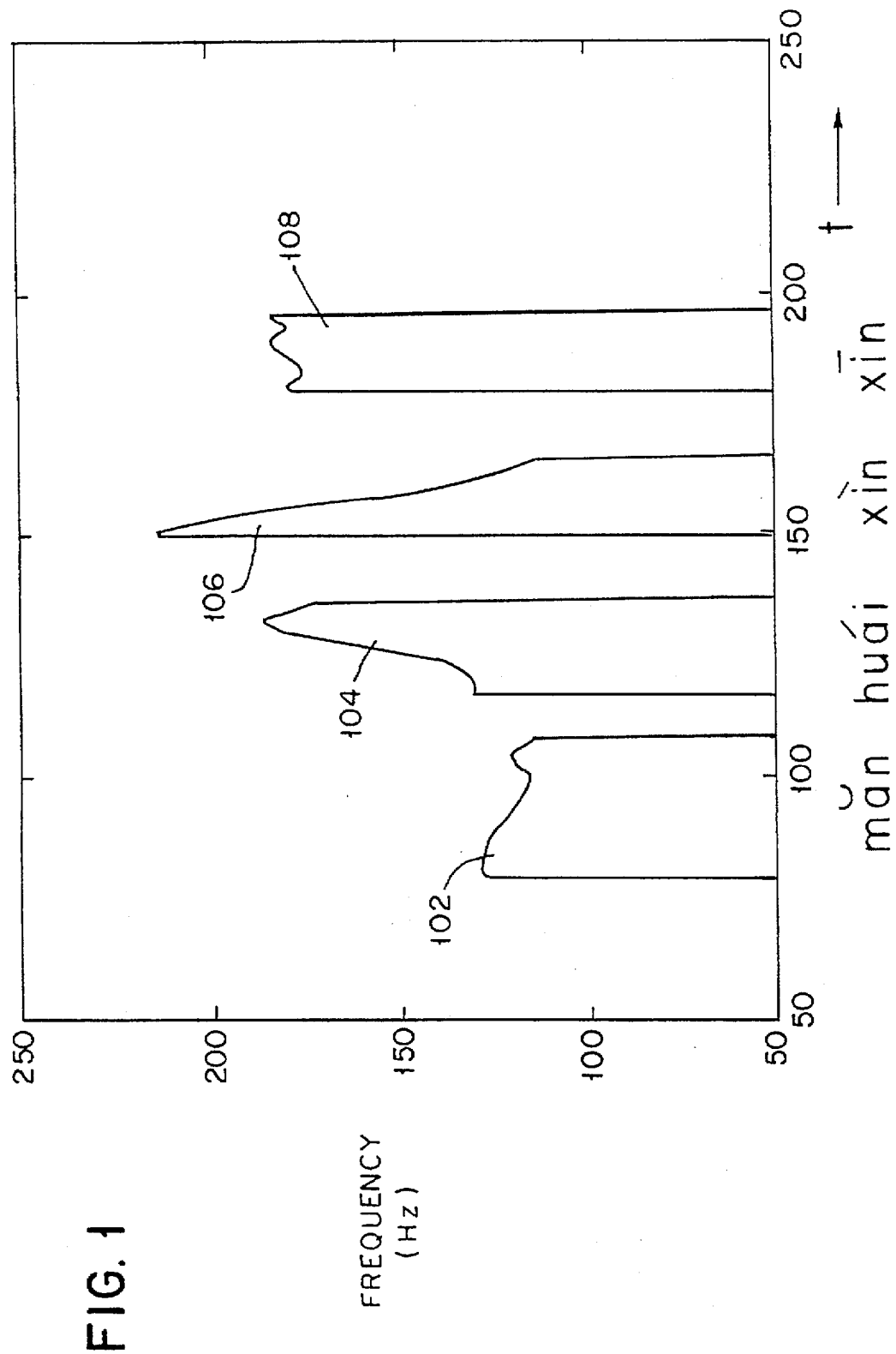
FIG. 1 depicts the continuous speech pitch contours for four syllables of differenting tones: low, rising, falling, and high.

We describe a new method of acoustic signal processing for Chinese language speech recognition which makes tone recognition an integrated part of a conventional Hidden Markov Model (HMM) approach. The method comprises the following characteristics:

1) Each syllable is decomposed into two phonemes of comparable length and complexity which are called premes and tonemes for the first and second phonemes, respectively.

2) All premes and tonemes can be represented by an equal number of states (e.g., 3) in a hidden Markov model.

3) Each toneme is assigned one of the following tone values: high; rising; low; falling; or untoned. In other words, tonemes with exactly the same vowel(s) and consonant ending, but different tones, are different phonemes.

4) No tone is associated with premes.

5) The tone value of a syllable is defined solely by the tone of its toneme.

6) Pitch is detected continuously and treated the same way as energy and cepstrals, that is, its instantaneous value and its derivative (and second derivative) are treated as independent parameters.

7) When pitch is undetermined or undeterminable from acoustic data, its nominal value is supplemented with a continuation algorithm.

The Toned Phoneme System

The concept of the toned phoneme system is conceived based on the inventors' following observations of Mandarin Chinese speech:

1) If a syllable has four single phones, the main phone (i.e., the phone having the greatest energy) is located at the third single phone, which is always a vowel.

2) If a syllable has three single phones, the main phone (with the greatest energy) is either at the second or at the third single phone, which is always a vowel.

3) The pitch and its derivatives (with respect to time) of the main vowel contains sufficient information to determine the tone of the entire syllable.

Therefore, it is possible to divide each syllable into two parts, wherein the second part always contains the main vowel, and thus contains sufficient information to determine the tone of the entire syllable. The tone is a property of the syllable; the pitch is a measurable quantity, and varies with respect to time. The tone is determined by the pitch contour. In such a division, the second part of the syllable can contain only one or two single phones. Specifically, there are three possibilities for the content of the second part of the syllable:

1) A single vowel, as in the case of "xia".

2) A diphthong, as in the case of "xiao".

3) A single vowel with a nasal ending, such as in the case of "xian".

In the case of speech recognition of American English, diphthongs and single vowels with nasal ending are considered as single phonemes, and treated with a set of three states in the hidden Markov model, just as in the case of a single vowel. Therefore, in each of the above three cases for Mandarin Chinese, the second part of a syllable can be treated as a single phoneme.

In the method of the present invention, elementary vowel phonemes (phonemes which contain the main vowel) having the same vowel(s) and (optional) nasal ending but having different tones are defined as different phonemes. Thus, for any one of the vowel phonemes, there are five possible toned phonemes. For example, the phoneme "a" has five toned phonemes, a1, a2, a3, a4, and a5, representing a vowel "a" with high, rising, low, falling, and untoned versions, respectively. A vowel phoneme with tone is referred to herein as a "toneme" to emphasize its tone content.

Because each elementary vowel phonemes corresponds to five tonemes, to make the number of tonemes manageable, it is advantageous to reduce the number of elementary vowel phonemes to a minimum. A direct application of the Pinyin initials and finals results in a very large number of phonemes (38×5+21=211). By grouping the glides with the initials, and leaving the main vowel in the second part, we can reduce the number of phonemes. Because this will reduce the context-dependency of the consonants, the recognition accuracy may improve. An example of the reduced phoneme system is shown in Table 1 and Table 2. These include 23 tonemes and 51 premes. Excluding the non-existant ER5, the total number of phonemes is 114 tonemes+51 premes=165 total phonemes. Table 1 lists all tonemes existing in Mandarin Chinese.

TABLE I

THE 114 TONEMES FOR MANDARIN CHINESE

| HIGH | RISING | LOW | FALLING | UNTONED |
|------|--------|-----|---------|---------|
| IH1  | IH2    | IH3 | IH4     | IH5     |
| I1   | I2     | I3  | I4      | I5      |
| IN1  | IN2    | IN3 | IN4     | IN5     |
| UN1  | UN2    | UN3 | UN4     | UN5     |
| U1   | U2     | U3  | U4      | U5      |
| IE1  | IE2    | IE3 | IE4     | IE5     |
| A1   | A2     | A3  | A4      | A5      |
| O1   | O2     | O3  | O4      | O5      |
| E1   | E2     | E3  | E4      | E5      |
| AI1  | AI2    | AI3 | AI4     | AI5     |
| EI1  | EI2    | EI3 | EI4     | EI5     |
| AO1  | AO2    | AO3 | AO4     | AO5     |

TABLE I-continued

THE 114 TONEMES FOR MANDARIN CHINESE

| HIGH | RISING | LOW | FALLING | UNTONED |
|---|---|---|---|---|
| OU1 | OU2 | OU3 | OU4 | OU5 |
| AN1 | AN2 | AN3 | AN4 | AN5 |
| EN1 | EN2 | EN3 | EN4 | EN5 |
| ANG1 | ANG2 | ANG3 | ANG4 | ANG5 |
| ENG1 | ENG2 | ENG3 | ENG4 | ENG5 |
| ING1 | ING2 | ING3 | ING4 | ING5 |
| ONG1 | ONG2 | ONG3 | ONG4 | ONG5 |
| YU1 | YU2 | YU3 | YU4 | YU5 |
| YUE1 | YUE2 | YUE3 | YUE4 | YUE5 |
| YUN1 | YUN2 | YUN3 | YUN4 | YUN5 |
|  | ER2 | ER3 | ER4 | ER5 |

The symbols are designed to be as close as possible to the Pinyin system. The only difference is the toneme IH. In the pinyin system, the default vowel for Z, C, S, R, ZH, CH, and SH is written as "i". Actually, the acoustic property is very different.

The first part of a syllable, left over by separating out the tonemes, is either a single consonant, or a consonant followed with a weak vowel, the so-called glide, "i", "u", or " ü.". It has been observed experimentally that the presence of those glides alter the preceding consonant from its very starting time. Therefore, it is logical to treat such a combination as a single phoneme. It has also been observed that there is always a glottal stop preceding syllables starting with a vowel. For the vowels "i" and "u", in the Pinyin system, the vowels with glottal stop are denoted as "y" and "w", respectively. For "ü", the vowel with glottal stop is often written as "yu". For vowels "a", "e", and "o", the glottal stop also exists. Therefore, for syllables starting with a vowel, the method of the present invention cuts off the part with a glottal stop as the first phoneme of the syllable. With such an arrangement, each syllable is then subdivided into two phonemes of roughly equal length and complexity, and each can be represented by the same number of states in the hidden Markov model. To denote the marked difference between those starting phonemes and the traditional concept of "initials", we name them "premes". The marked difference between a preme and an initial is that a preme may contain a single consonant, a glottal stop, a consonant with a glide, or a glottal stop with a glide. The total number of premes is about 50. In accordance with the present invention, pitch information associated with a preme is ignored. Table 2 lists all the premes in Mandarin Chinese.

TABLE II

THE 51 PREMES FOR MANDARIN CHINESE

| B | G | LU | QI | TU | GS * |
|---|---|---|---|---|---|
| B1 | GU | M | QU | XI |  |
| C | H | MI | R | XU |  |
| CU | HU | MU | RU | Z |  |
| CH | JI | N | S | ZU |  |
| CHU | JU | NI | SU | ZH |  |
| D | K | NU | SH | ZHU |  |
| DI | KU | P | SHU | YU |  |
| DU | L | PI | T | W |  |
| F | LI | BU | TI | Y |  |

*glottal stop for [a], [e], and [o].

Based on the following observations, the inventors found that preme tone can be ignored. For premes containing only an unvoiced consonant, there is no pitch information. For premes containing a voiced consonant or a glide, pitch information does exist, and the pitch value does depend on the tone of the syllable. Because the pitch value of a toneme contains sufficient information to determine the tone of the entire syllable, the pitch value of the preme is redundant (and often ill-defined). Therefore, in the training process and the decoding process, the pitch data for the premes, even if available, is ignored.

Treatment of Pitch Data in the Training and Decoding Processes

A typical acoustic process for English and other European languages is as follows:

1) The digitized speech data (pcm) goes through a fast Fourier transform (FFT) every 10 milliseconds. The absolute values of the FFT are accumulated over 24 frequency bands, and a cosine transform of the logarithm resulting vector (called cepstra) are taken as parameters.

2) The instantaneous energy of the pcm data is taken as the 13th parameter.

3) The instantaneous values and the first and second derivatives of the 13 parameters taken as independent variables to describe the speech. Thus there are 39 variables per frame (i.e., 10 millisecond sample of speech).

The above standard processing is described in References 1 through 3. (See *Robust Methods for Using Context-Dependent Features and Models in a Continuous Speech Recognizer*, L. R. Bahl, P. V. de Souza, P. S. Gopalakrishnam, D. Nahamoo, M. A. Picheny, ICASSP-94, I-533; *Towards Large Vocabulary Mandarin Chinese Speech Recognition*, H-W. Hon, B. Yuan, Y-L. Chow, S. Narayan and K-F. Lee, ICASSP-94, I-545; and U.S. Pat. No. 5,220,639: *Mandarin Speech Input Method for Chinese computers and a Mandarin Speech Recognition Machine*, L. S. Lee, (Jun. 15, 1993). Each of these is incorporated by reference herein.)

There has been a lot of interest in pitch detection for speech recognition for two decades, and a number of methods for pitch detection have been reported. The three most widely used methods are autocorrelation, subharmonic summation, and the real cepstrum methods. Any of these three methods can be applied to extract pitch values. Typical results are shown in FIG. 1. In FIG. 1, there are four syllables, having low 102, rising 104, falling 106, and high 108 tones, respectively. Although the speech that was measured to produce the graph of FIG. 1 was continuous speech, no pitch values are associated with the last three consonants (h, x and x), because these are unvoiced consonants, which have no pitch. Thus, the pitch contours displayed in FIG. 1 appear to be discontinuous. If this raw data is taken literally as a parameter, our experience showed that it will confuse the computer. To simplify the training process, these discontinuities are masked with false signals. That is, in a preferred embodiment of the invention, the data passes through a continuation algorithm in order to produce simulated tone values for the un-toned portions of a syllable. This simulation process comprises the following steps:

1) take the logarithm of the instanteneous values of the pitch if the pitch value exists;

2) calculate a running average of the meaningful data (i.e., all the pitch values if it exist);

3) add a random signal at the beginning of the speech data where there is silence;

4) when a voiced section ends and the pitch becomes undetermined, determine an exponential decay towards the running average, and add a random signal (to simulate noise) to thereby extrapolate simulated pitch values for the pitch-less regions of the data stream.

Figure 2:
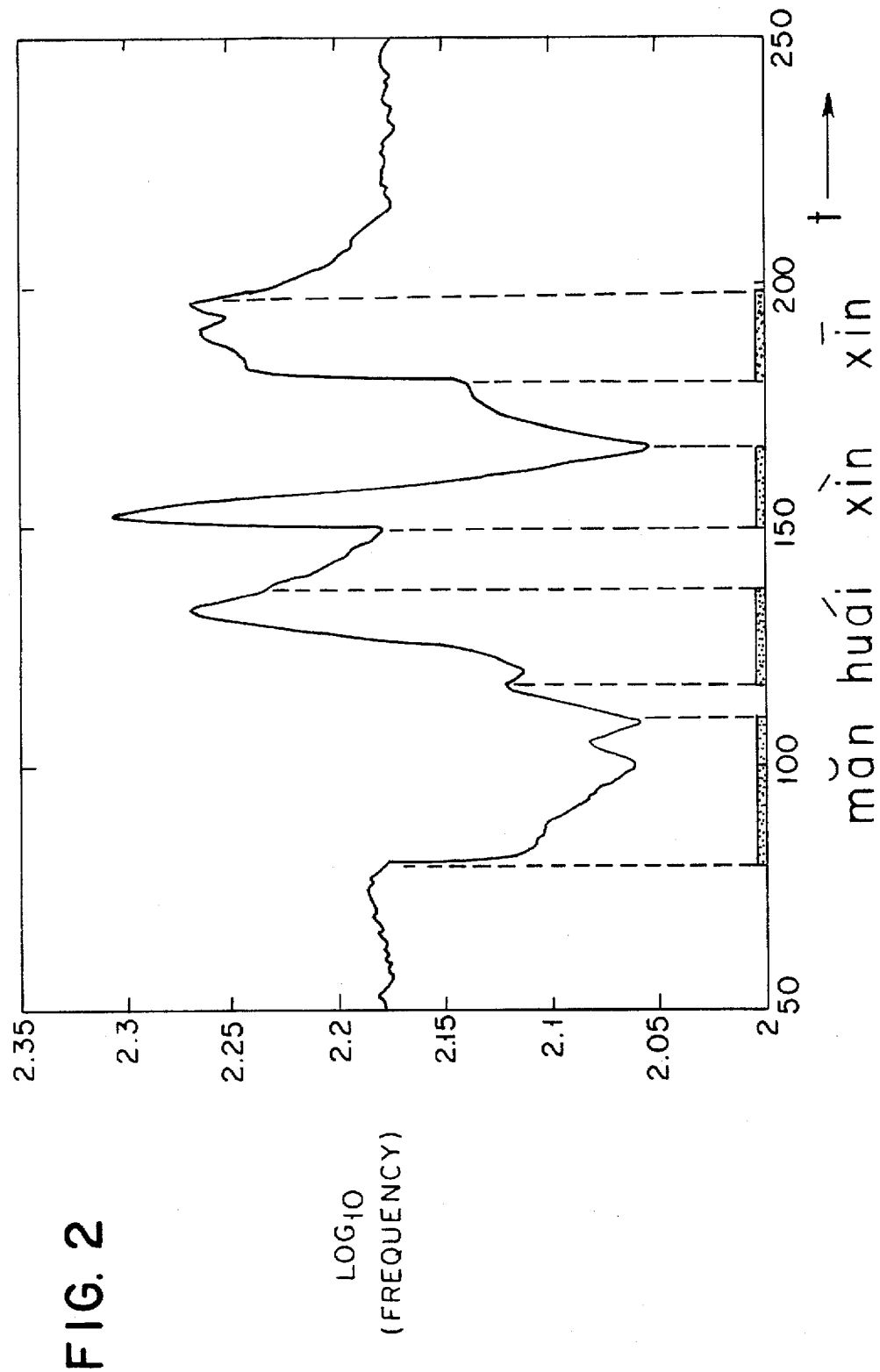
FIG. 2 depicts the pitch contours of the syllables shown in FIG. 1, with the addition of false signals in place of the pitch-less segments shown in FIG. 1.

The result of the foregoing procedure, as applied to the data of FIG. 1, is shown in FIG. 2. The dashed vertical lines indicate the temporal boundaries of the actual pitch measurement, shown in FIG. 1. The stream of pitch data including the extrapolated pitch values are then used in training and decoding the same way as the 12 cepstral parameters and the energy of typical phonemes. In other words, the instantaneous value, and the first and the second derivatives are each taken as independent variables. Adding to this the pitch, therefore, brings the total to 14 parameters describing the input signal. Together with the first and second derivatives of each of these parameters, there are 42 variables.

Our experiments have indicated that the extrapolation process with an exponential and a random signal is necessary to avoid the occurrence of zero variance.

Figure 3:
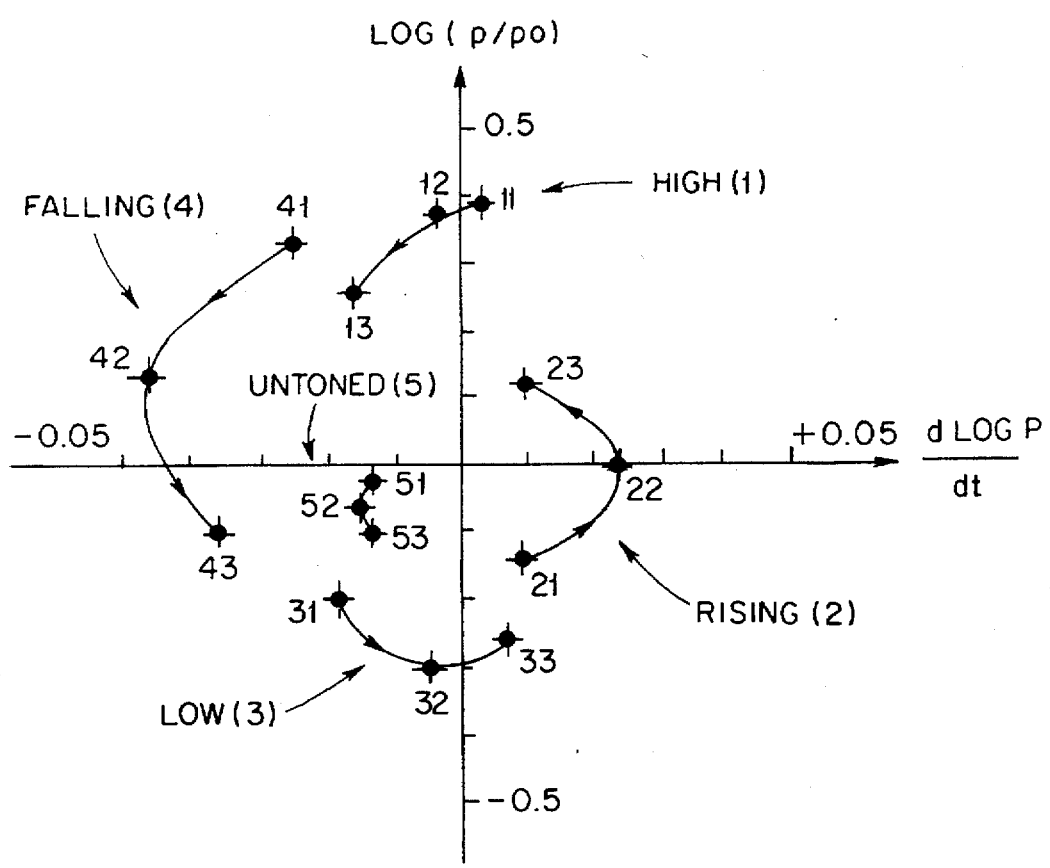
FIG. 3 shows the trajectories in the pitch/pitch derivative space of five tones: high, rising, falling, low and untoned.

FIG. 3 shows a plot of the mean values of the logarithm of the ratio of a pitch value p at a given time to an initial pitch value po, and the derivative of the logarithm of pitch for different tones (high, rising, low, falling, untoned), averaged from some 1000 syllables. The three coordinates defining each trajectory represent the three states in a HMM. As shown, the pitch values for the high tone (tone 1) is roughly 1.5 times the average pitch, i.e., (at the average value, the log(p/po) is zero, i.e., the x axis. The ratio is determined by its logarithm.) At the end of the syllable, point 13, the pitch actually drops to about 1.3 times the average pitch. This is reasonable since all other tones have a lower pitch. A smooth transition requires that towards the end of a high-pitch syllable, the pitch value goes down with time. In other words, to make a continuous transition to a following syllable, the average pitch of the high tone should be lower at its end to accommodate the transition. It can be seen that the pitch value for the rising tone (tone 2) is indeed rising, and the pitch derivative is indeed always positive. However, the average pitch values in continuous speech are around the average, instead of always high as in isolated syllable utterances. It is well known that the pitch value for the low tone (tone 3) is about 0.75 of the average pitch, which is as expected. The derivative goes from negative at point 31 to positive at point 33. The second derivative should be positive and large, also as expected. However, the average ending pitch is still very low in continuous speech, in contrast to becoming high as in the case of isolated syllable utterances. For the falling tone (tone 4), the pitch values drops rapidly from point 41 to point 43, as expected. The derivative is negative and large, also as expected. The average pitch of the degenerate tone (tone 5) is near the running average of all meaningful pitch data, and the derivatives from beginning to end (points 51 to 53) are negative but small. An interesting property of the four tones is that the trajectory of each of the means runs an arc in the counter-clockwise direction. The trajectory of the untoned syllable appears near the center of the ring. This is helpful for tone recognition, because the positions of the first tonemes (e.g., 11, 21, etc.) for all the five tones are well-separated, and the same is true for the second (e.g., 12, 22, etc.) and third tonemes (e.g., 13, 23, etc.) for all tones.

Figure 4:
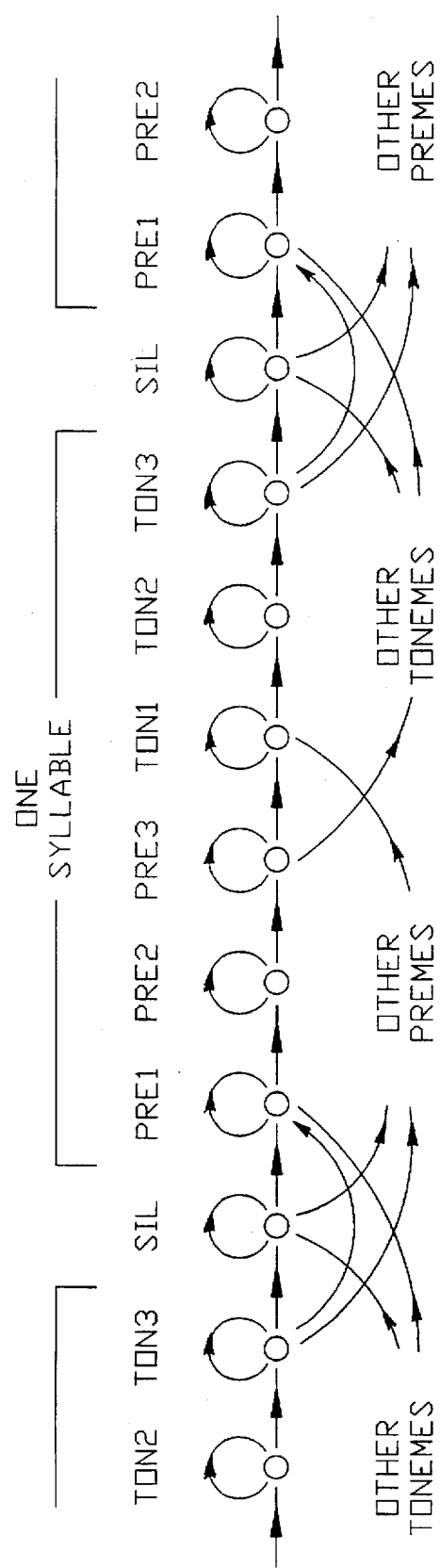
FIG. 4 is a schematic of a Hidden Markov Model for a Mandarin Chinese language syllable.

FIG. 4 is a schematic representation of the Hidden Markov Model (HMM) representation of a syllable (comprising phoneme and tone data) to be processed in accordance with the invention. Also shown on either end of the schematic are contextual data. The segment of interest is denoted in FIG. 4 as "one syllable". The syllable is separated from a preceding following syllable by a period of silence denoted as "sil". The schematic runs temporally from left to right.

Figure 5:
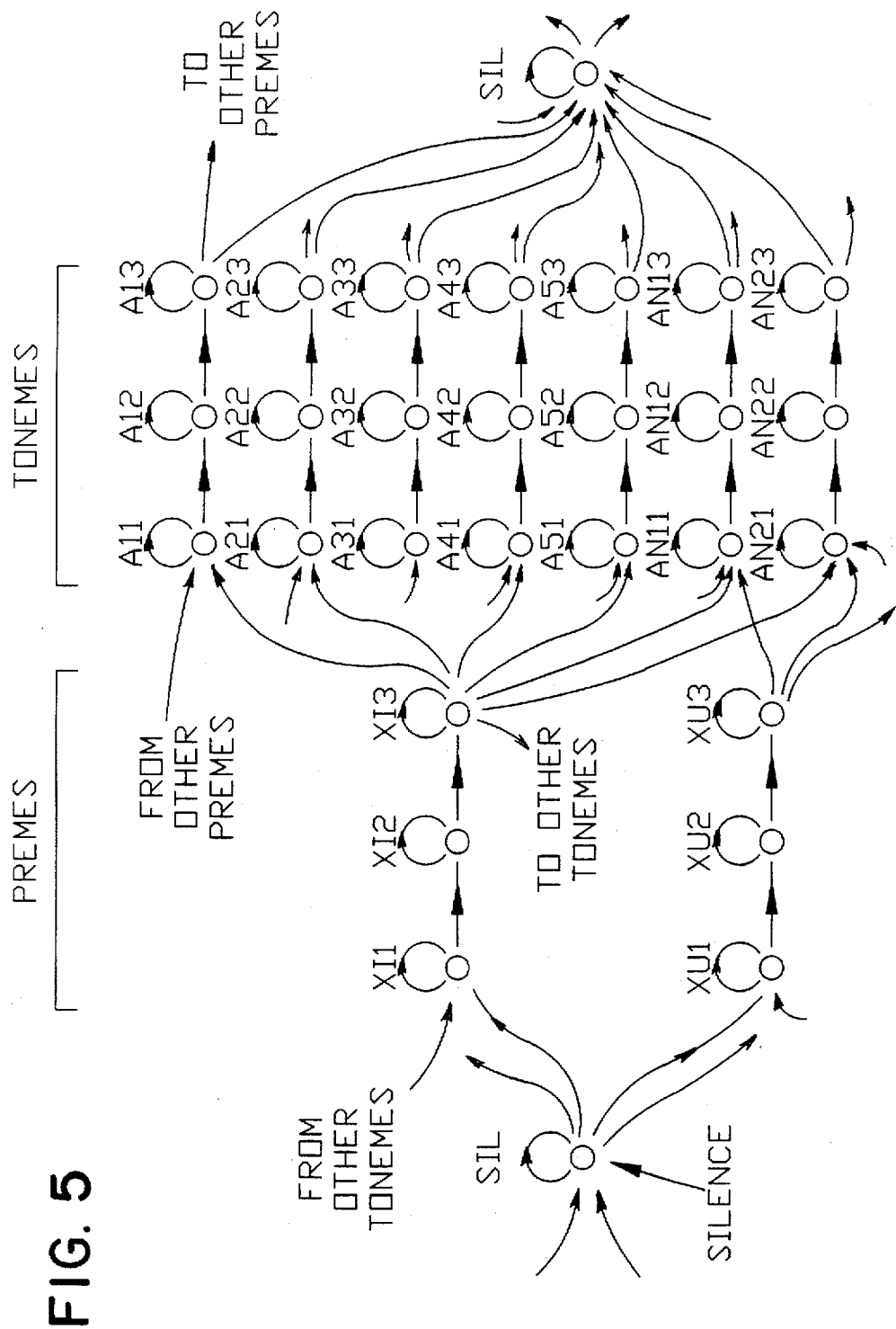
FIG. 5 is a detailed schematic of a Hidden Markov Model showing premes and tonemes in accordance with the invention.

As can be seen, the syllable is represented by six Markov Model states: three representing the preme or first half of the syllable, and three representing the toneme, or second half of the syllable. As discussed previously, each preme must be followed by a toneme, while a toneme can be followed by either silence or a preme. In accordance with the present invention, premes and tonemes are always represented by an equal number of states. FIG. 4 shows only one possible combination of premes and tonemes. FIG. 5 provides a more detailed view of the structure of the HMM.

FIG. 5 shows the details of a portion of the HMM used in a preferred embodiment of the invention. The HMM begins on the left with silence, denoting the separation of syllables, followed by the preme of the syllable to be recognized, followed by the toneme of the syllable.

FIG. 5 shows, for reasons of simplicity, only the states for the preme prototype vectors XI1, XI2 and XI3, and XU1, XU2 and XU3. Similarly, the toneme portion of the HMM shows only a subset of all possible tonemes.

As discussed previously, tonemes with identical vowels but different tones (pitch contours) represent different phonemes. Note also that in FIG. 5, some transitions do not exist. For instance, there is no possible transition from XI3 to A31. This is because, based on previously observed data, no such transition exists in the language.

Figure 6:
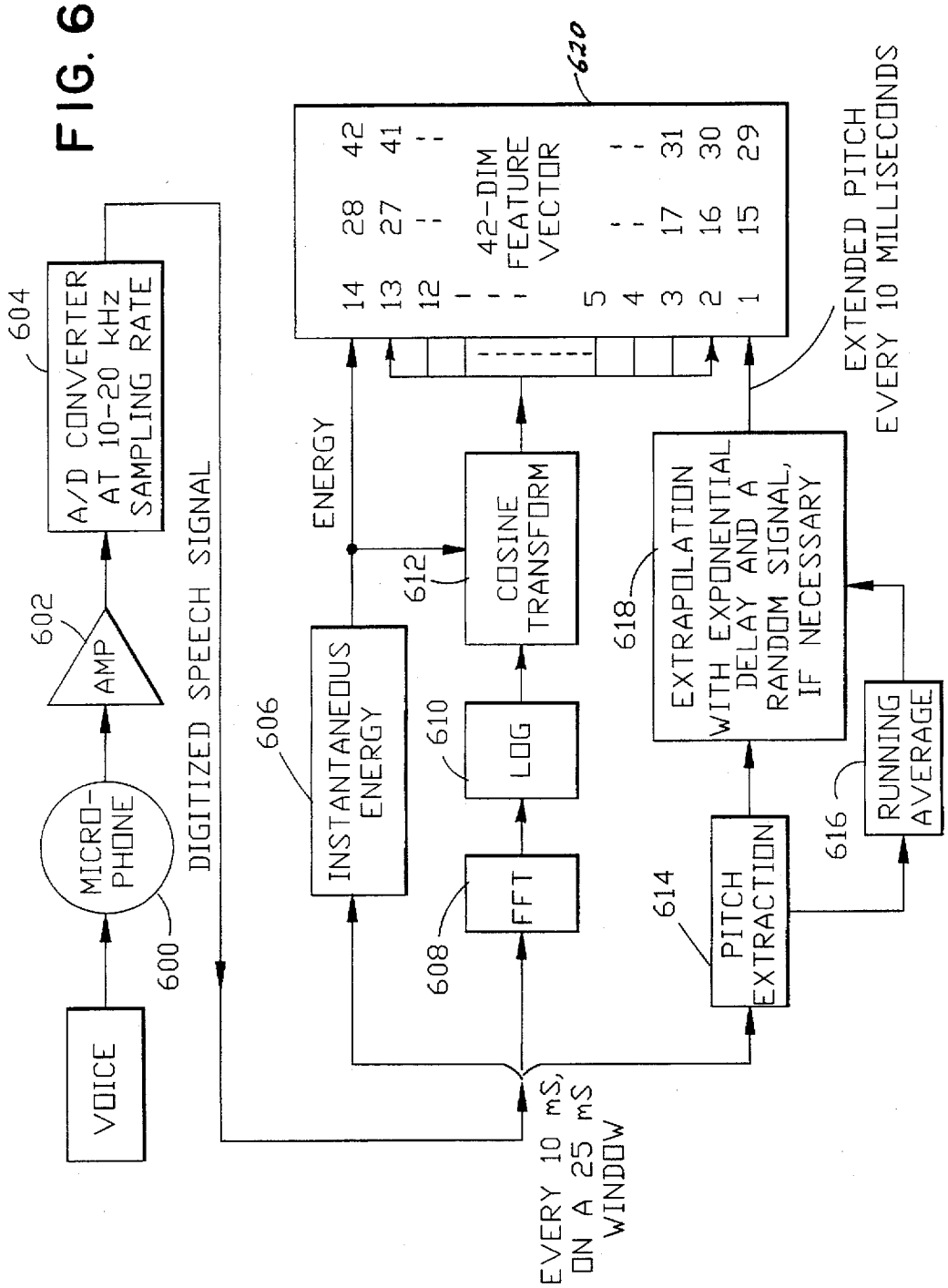
FIG. 6 is a block diagram of a system in accordance with the invention.

Referring to FIG. 6, a preferred embodiment of a system in accordance with the invention will now be described. Included in the system is a microphone for receiving voice inputs from a speaker and converting those inputs into an analog electrical signal. The amplitude of the analog signal (represented in dB) is amplified in amplifier 602 and digitized by analog/digital (A/D) converter 604 at a sampling rate of about 10–20 kHz. The digitized signal is then applied as input to three different components (to be described in detail below):

a) instantaneous energy measurement means 606, such as computation of the mean of the square of the pcm data over 25 milliseconds;

b) fast Fourier transform (FFT) means 608, log circuit 610, wherein the logarithm of the absolute value of the output of FFT 608 is taken, and cosine transform means 612;

c) pitch extraction means 614, which provides output to running average detection means 616 and means 618 for extrapolating with exponential delay and introduction of a random signal.

The instantaneous energy, as determined by means 606, is the square of the amplitude of the signal, and averaged over a given time period. In a preferred embodiment of the invention, the time periods used are 10 ms sampling periods. That is, the instantaneous energy of a given point is determined by calculating the average of the square of the amplitude values over a 10 ms period centered at the point of interest. Another suitable time period may be 25 mS. The particular time period selected, however, is merely a matter of design choice.

Pitch extraction means 614 can be software running in a multipurpose computer, the software functioning to determine the fundamental period of the digitized speech signal output from A/D converter 604. The fundamental frequency of the signal determines the pitch of the frame. As has already been described, there is no pitch associated with silence and unvoiced consonants. In the event that there is no pitch associated with a given frame, extrapolation means 618 uses pitch information from pitch extraction means 614 and running average means 616 to generate extrapolated signals to be inserted into the gaps in the digitized speech signal resulting from the absence of pitch. These extrapolated signals introduced into the pitch gaps are not used for analytical purposes. Rather, these signals are used merely to prevent the signal variance from being calculated as zero. Thus, in accordance with the invention, the introduction of extrapolated signals greatly simplifies the procedure for identifying the tone of the syllable being analyzed.

The output of extrapolation means 618 is an "extended pitch" signal, i.e., the original pitch contour of the speech (for instance, as shown in FIG. 1) plus the extrapolated signals. An example of an extended pitch signal was shown in FIG. 2.

The outputs of instantaneous energy determination means 606, the 12 ceptra output from cosine transform 612 and the extended pitch output from extrapolation means 618, along with the first and second derivatives of each of these signals, are stored as a feature vector in an array 620. In a preferred embodiment, one such array is stored for each 25 ms frame of speech information.

Figure 7:
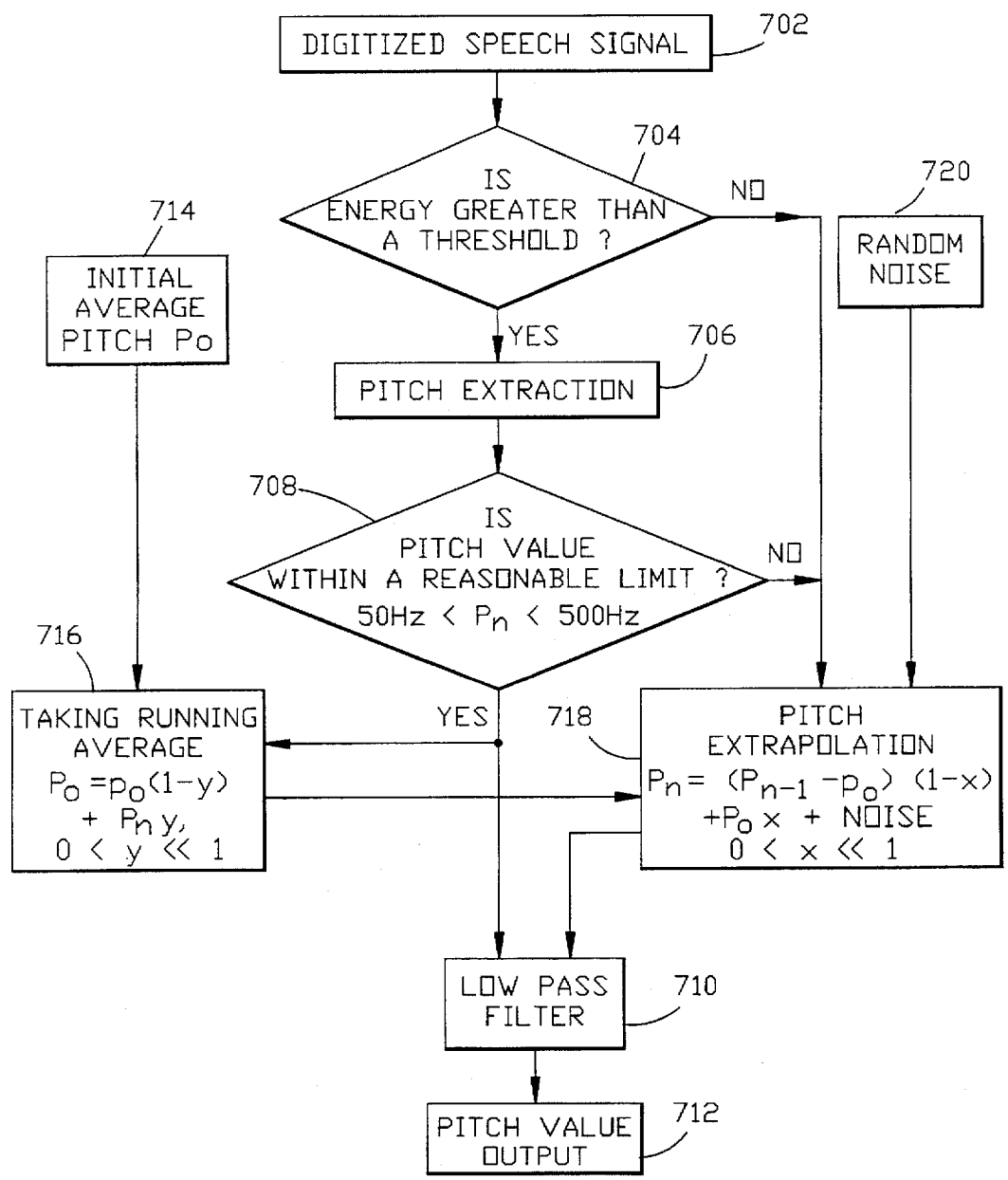
FIG. 7 is a flow diagram showing the details of the pitch extrapolation method of the present invention.

FIG. 7 shows the details of a preferred algorithm for implementing the pitch extraction, running average and extrapolation functions of FIG. 6. The digitized speech signal is input at block 702. At block 704, it is determined whether the energy (as calculated in block 606) of the current frame is greater than a threshold, block 706. If signal energy is below a threshold, it indicates an absence of pitch and the need for extrapolation. If the energy is above the threshold, pitch extraction proceeds. Pitch extraction is accomplished by determining the instantaneous frequency of the frame. If the pitch value is within a reasonable limit, for example, between 50 Hz and 500 Hz, (This is the range of human speech, including male and female) block 708, the digitized speech signal passes through a low pass filter, block 710, to eliminate signal noise, and the pitch value is output, block 712.

A second input to the algorithm of FIG. 7 is an initial average pitch value Po, block 714. A running average of the pitch is then computed, at block 716, as follows $$P_o = p_o(1-y) + P_n y,$$

$$0 < y << 1,$$

where $P_o$ is the running average pitch value, $p_o$ is the initial pitch value, y is a small number to determine the time period of taking the average. Specifically, it is the inverse of the number of frames of the time period. The running average is then used to extrapolate a pitch signal.

A pitch value will be extrapolated at block 718 if either the energy of the digitized speech signal is below a threshold, block 704, or the pitch value of a digitized speech signal is not within a reasonable range, block 708. In either event, an extrapolated pitch signal will be computed as follows $$P_n = (P_{n-1} - p_o)(1-x) + P_o x + \text{noise},$$

$$0 < x << 1,$$

where Pn is the instantaneous value at time n of the extrapolated pitch signal, pn−1 is the pitch at the immediately preceding time and x is another small number determining the time scale for extrapolation. Specifically, it is the inverse of the number of frames during the time period of exponential extrapolation. The noise component originates at noise generator 720.

After the extrapolated signal is computed, the extrapolated signal and the original digitized signal are summed and passed thorough a low pass filter, block 710, before being output to the array 620.

Experimental Results

The method of the present invention was tested using 1188 training sentences read by a male speaker. The test data was another 100 sentences by the same speaker. All speech was in the continuous mode, with a normal speaking rate. Using the method of the invention, the error in tone recognition was 1.7%. The error attributable to acoustic error was 7.6%, and the homonym error was 2.5%

As the present experiment was performed in a continuous speech mode, it brings a real opportunity to develop a Chinese language dictation system in the continuous speech mode. The method is equally applicable to other dialects in the Sino-Tibetan family of languages, or any other language for which tone is an indispensable element. Of course, the method is also useful for isolated-word speech recognition.

While the invention has been described in particular with respect to preferred embodiments thereof, it will be understood by those skilled in the art that modifications to the disclosed embodiments can be effected without departing from the spirit and scope of the invention.

We claim:

1. A method for recognizing words of speech comprising at least one syllable having tonal content, the method comprising the steps of:

decomposing said at least one syllable into a preme and a toneme, the toneme having a tone value; and recognizing the words of speech based on the preme and toneme of said at least one syllable including the steps of:

continuously detecting a pitch value for the toneme of said at least one syllable;

creating at least one pitch contour based on the detected pitch value;

determining whether a discontinuity representing an un-toned portion of said at least one syllable exists between adjacent pitch contours and if so producing at least one simulated tone value to mask the discontinuity;

obtaining parameters from the pitch value for the toneme and from a derivative of the at least one pitch contour; and determining the tone value of the toneme of said at least one syllable using the parameters.

2. The method of claim 1, wherein the preme and toneme for said at least one syllable are of approximately equal duration.

3. The method of claim 1, wherein the preme of a syllable is a phoneme representing a first portion of each syllable.

4. The method of claim 1, wherein the toneme of said at least one syllable is a phoneme representing an end portion of said at least one syllable.

5. The method of claim 1, wherein the tone value of said at least one syllable is defined as the tone value of said at least one syllable's toneme.

6. (Amended) The method of claim 1, wherein any tonal content of the preme of said at least one syllable is ignored for purposes of determining the tone value of the toneme of said at least one syllable.

7. The method of claim 4, wherein values of the tone of a toneme include high, rising, low, falling, untoned, and neutral.

8. The method of claim 1, wherein the step of producing said at least one simulated tone value to mask the discontinuity includes the steps of:

deriving the logarithm of the pitch value for the toneme of said at least one syllable; and extrapolating the at least one pitch contour at the discontinuity with an exponential decaying towards a running average combined with a random signal.

9. A system for recognizing words of speech comprising at least one syllable having tonal content, comprising:

means for decomposing said at least one syllable into a preme and a toneme, the toneme having a tone value; and means for recognizing the words of speech based on the preme and toneme of said at least one syllable comprising:

means for converting the words of speech into an electrical signal;

pitch extraction means for extracting a pitch value for the toneme of said at least one syllable if the signal energy is above a threshold;

means for extrapolating the signal wherever the signal energy is below the threshold or the extracted pitch value is not within a pre-determined range to generate an extended pitch signal;

storage means for storing data including the extended pitch signal and at least one derivative of the extended pitch signal; and means for determining the tone value of the toneme of said at least one syllable using the stored data.

10. The system of claim 9, wherein the means for decomposing said at least one syllable into a preme and a toneme comprises:

an A/D converter for receiving the signal of the converting means;

means for detecting a beginning and an end of said at least one syllable; and means for designating a first portion of said at least one syllable as the preme, and for designating a second portion of said at least one syllable as the toneme, the preme and toneme of said at least one syllable being of comparable duration.

11. The system of claim 10, wherein a hidden Markov model is used to represent the toneme and toneme of said at least one syllable.

12. The system of claim 9, further comprising a low pass filter for passing low frequencies of the extended pitch signal.

* * * * *